Dec. 12, 1961     G. BAYER     3,012,902
PROCESS OF REACTING A VAPOROUS METAL WITH A GLASS SURFACE
Filed Dec. 8, 1959
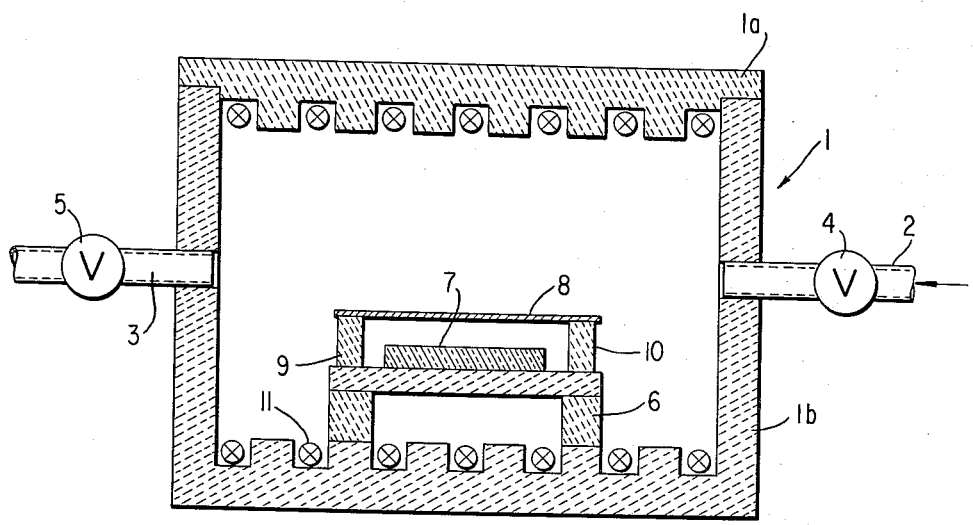
INVENTOR.
GERHARD BAYER
BY
*W. A. Schaich and Charles S. Lynch*
ATTORNEYS

3,012,902
PROCESS OF REACTING A VAPOROUS METAL WITH A GLASS SURFACE
Gerhard Bayer, Hinteregg, Zurich, Switzerland, assignor to Owens-Illinois Glass Company, a corporation of Ohio
Filed Dec. 8, 1959, Ser. No. 858,051
7 Claims. (Cl. 117—33.3)

This invention is concerned with the reaction of a vaporous metal with a glass surface. More specifically this invention relates to a novel method for effecting a chemical reaction between a vaporous metal and a glass surface.

It is known that various metals will react with a glass but the temperatures required for this reaction must be around 1250° C. or 2300 F. (J. A. Ceramic Society 23, 1326–8). However, it has now been discovered with the present invention that various metals may be made to combine with a glass surface at a much lower temperature.

It is, therefore, an object of this invention to provide a novel process whereby various metals will react with a glass surface to change the light transmission characteristics of the glass at temperatures less than 900° C. A further object of this invention is to carry out the novel process herein disclosed with metals having a vapor pressure of at least $1 \times 10^{-1}$ mm. at temperatures below 900° C. These and other objects will be apparent from the following description taken in conjunction with the accompanying drawing.

The novel process of this invention comprises reacting the metal with a glass surface by placing the glass to be heated in a gas tight vessel and subjecting the glass to temperatures from 500° C. to 650° C. in a reducing or neutral atmosphere. The metal is in the same vessel at a distance not exceeding one inch from the glass. Under such conditions enough metal vapor will be formed which will come in contact with the glass surface and react with it.

The single figure represents one type of apparatus which can be employed to practice the present invention. A chamber 1, separable into parts 1a and 1b, is connected by inlet pipe 2 to a source (not shown) of reducing gas, such as hydrogen, and to an outlet pipe 3. Each pipe has valves 4 and 5, respectively, for controlling the flow of gas. Within chamber 1 is a support member 6 of heat resistant material, such as a ceramic or metal of high melting point. Mounted on member 6 is the glass article 7 which is positioned no further than one inch from a selected metal 8 which will be vaporized to varying degrees at temperatures from 500° C. to 650° C. Metal 8 is in turn supported by heat resistant members 9 and 10 which are similar in composition to member 6. Mounted in the walls of chamber 1 are electrical heating elements 11 for maintaining the interior of chamber 1 at the desired temperature.

In operation glass article 7 is placed on support 6 and a metal, such as magnesium, is mounted on supports 9 and 10 within chamber 1. Hydrogen is introduced into chamber 1 by opening valves 4 and 5 and which also purges the chamber 1 of any air. The valves are then closed, and heat is applied to the interior of chamber 1 for about two hours, by means of electrical heating elements 11 such that the interior of chamber 1 reaches the requisite temperature. A vaporization of the metal occurs, and this vapor chemically unites with the surface of the glass so as to alter the properties of the glass 7.

The present invention will be more completely understood by reference to the following examples.

*Example I*

A soda-lime glass is placed in a gas tight vessel at a distance of three-fourths inch from a source of magnesium. The reaction is carried to completion after two hours heating at 520° C. (970° F.) in a hydrogen atmosphere. The color of the glass changes to a yellow-amber tint and the chemical reaction is believed to be as follows between the glass surface and metal:

(1) 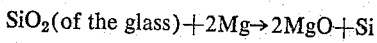
$$SiO_2(\text{of the glass}) + 2Mg \rightarrow 2MgO + Si$$

The light transmission of the original is noted to have decreased in the ultra-violet region to about 3 percent in a glass sample 1 mm. thick.

*Example II*

The process of Example I is repeated except that the glass is positioned at one-half inch from the magnesium and the temperature is maintained at 560° C. (1040° F.) for two hours in a nitrogen atmosphere. The color of the glass changes to black, and the chemical reaction is believed to be as follows with respect to the interaction of the glass surface with the magnesium:

(2) 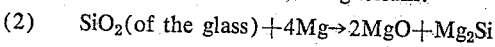
$$SiO_2(\text{of the glass}) + 4Mg \rightarrow 2MgO + Mg_2Si$$

*Example III*

The process of Example II is repeated except that the magnesium metal is only one-fourth inch away from the glass. In this reaction the glass is noted to have a black coating on which there is a shiny silvery coating of magnesium. The chemical reaction is considered to be as follows:

(3) 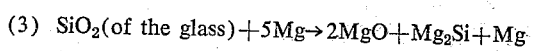
$$SiO_2(\text{of the glass}) + 5Mg \rightarrow 2MgO + Mg_2Si + Mg$$

*Example IV*

The process of Example II is repeated with similar results except that the metal is calcium and calcium silicide is observed to be present in the glass surface as a result of the chemical reaction of the calcium with the glass substrate.

The foregoing examples are presented merely as illustrations and are not to be construed as limitative of the present invention. For example, other metals can be used besides magnesium including barium, beryllium, calcium, and strontim. Although the preceding group 2a metals having atomic numbers from 4 to 56 inclusive are especially useful and preferred the reaction is also applicable to other metals such as lithium, cesium, rubidium, selenium, telurium, lead, titanium, uranium, aluminum, bismuth, and antimony. It is also to be noted that gases other than hydrogen and nitrogen, such as argon and helium including mixtures thereof can be used for the reducing or neutral atmosphere to be maintained in the reaction vessel. The temperatures which can be employed can vary from 500° C. to 650° C. with the preferred range being around 520° C. to 560° C. Moreover, the reaction can be carried out over a period of time varying from 1 to 3 hours with about two hours being the optimum period. In general shorter heating periods can be used where the higher ranges of temperature are involved. Finally the metal can be positioned varying from near contact to one inch from the glass with the preferred distance being about one-fourth to three-fourths of an inch.

The present invention is not to be construed as merely a process where the metal is simply deposited upon the glass substrate as a layer or film except in reaction 3 above where some magnesium is deposited (Example III) due to the magnesium being in excess. On the contrary the primary phenomenon in Equations 1, 2 and 3 is one of chemical reaction whereby the substrate glass, which is always maintained at a temperature in excess of 500° C. during the process, chemically combines or reacts with the vaporous metal. X-ray diffraction studies have identified the reaction products referred to in Equations 1, 2 and 3 above as being present in the surface of the glass or substrate being coated, and these products can not be removed without the destruction of the surface of the substrate. In other words the glass substrate has been changed in character and composition due to chemical reaction occurring and not to simple metal film deposition.

The novel process of this invention is applicable to various types of glasses, which must contain some silica as a component part, including soda-lime, borosilicate, flint, Pyrex, crown, potash-lime, and the like.

It will be further noted that the metal vapor reaction can be carried out in several degrees depending on the temperature, time, and the distance the glass is from the vaporizing metal. These degrees can be designated first degree, second degree, and third degree and are represented by Equations 1, 2, 3 above, respectively. The example given above are merely by way of illustration, and it is to be understood that each of the degrees is representative of a general type of reaction of which the following are further illustrations thereof.

First degree:
$$3SiO_2 + 2Al \rightarrow Al_2O_3 + 3Si$$
$$SiO_2 + 2Ca \rightarrow 2CaO + Si$$
$$SiO_2 + 2Ba \rightarrow 2BaO + Si$$
$$SiO_2 + 2Sr \rightarrow 2SrO + Si$$
$$SiO_2 + 2Be \rightarrow 2BeO + Si$$
$$SiO_2 + Ti \rightarrow TiO_2 + Si$$

Second degree:
$$3SiO_2 + 8Al \rightarrow 2Al_2O_3 + Al_4Si_3$$
$$SiO_2 + 4Ca \rightarrow 2CaO + Ca_2Si$$
$$SiO_2 + 4Ba \rightarrow 2BaO + Ba_2Si$$
$$SiO_2 + 4Sr \rightarrow 2SrO + Sr_2Si$$
$$SiO_2 + 4Be \rightarrow 2BeO + Be_2Si$$
$$3SiO_2 + 8Sb \rightarrow 2Sb_2O_3 + Sb_4Si_3$$

Third degree:
$$3SiO_2 + 9Al \rightarrow 2Al_2O_3 + Al_4Si_3 + Al$$
$$SiO_2 + 5Ca \rightarrow 2CaO + Ca_2Si + Ca$$
$$SiO_2 + 5Ba \rightarrow 2BaO + Ba_2Si + Ba$$
$$SiO_2 + 5Sr \rightarrow 2SrO + Sr_2Si + Sr$$
$$SiO_2 + 5Be \rightarrow 2BeO + Be_2Si + Be$$
$$SiO_2 + 5Pb \rightarrow 2PbO + Pb_2Si + Pb$$

Each of the glasses prepared by any of these three degrees are found to have properties particularly suitable for certain purposes. For example, glasses made by the first degree reaction have very hard surfaces and are resistant to corrosion due to the presence of silicon in the surface. In addition the glass products made by the first degree reaction are especially suitable for lenses, eyeglasses, and glass filters where low transmission of ultraviolet is desired. The glasses formed by the second degree reaction are semiconductive due to the presence of the silicon and dimagnesium silicide while the glasses formed by the third degree reaction have in addition a shiny layer of metal which makes them suitable for special purposes where conductivity and reflectivity in addition to limited transmission are desired.

While I have described and illustrated preferred embodiments of my invention, I wish it to be understood that I do not intend to be restricted solely thereto, but that I do intend to cover all modifications thereof which would be apparent to one skilled in the art and which come within the spirit and scope of my invention.

Having thus fully described and illustrated the character of the instant invention, what is desired to be secured by Letters Patent is:

1. In a method of altering the light transmission characteristics of a glass, the steps comprising reacting a glass surface heated to a temperature from 500°–650° C. with a vaporous metal from a source of metal of the same temperature and not more than one inch from said glass and selected from the group consisting of group $2a$ metals having an atomic number from 4–56 inclusive, aluminum, selenium, tellurium, lead, antimony, bismuth, lithium, cesium, rubidium, and uranium in a gaseous atmosphere in which the gas is selected from the group consisting of hydrogen, argon, helium, neon, and nitrogen and mixtures thereof for a period of 1 to 3 hours.

2. The method of claim 1 in which the vaporous metal is a group $2a$ metal having an atomic number from 4 to 56 inclusive.

3. The method of claim 1 in which the metal is Mg and is positioned about one-half inch from the glass, the gas is hydrogen, and the temperature is maintained at about 520° C. for about 2 hours.

4. The method of claim 1 in which the metal is calcium.

5. The method of claim 1 in which the metal is barium.

6. The method of claim 1 in which the metal is strontium.

7. The method of claim 1 in which the metal is beryllium.

References Cited in the file of this patent

UNITED STATES PATENTS

| | | |
|---|---|---|
| 1,497,417 | Weber | June 10, 1924 |
| 2,479,540 | Osterberg | Aug. 16, 1949 |

FOREIGN PATENTS

| | | |
|---|---|---|
| 722,915 | Great Britain | Feb. 2, 1955 |